United States Patent [19]

Mitchell

[11] 3,846,372

[45] Nov. 5, 1974

[54] SMOKE RETARDANT VINYL CHLORIDE POLYMER COMPOSITIONS

[75] Inventor: Lawrence C. Mitchell, Mt. Vernon, Ind.

[73] Assignee: Ethyl Corporation, Richmond, Va.

[22] Filed: Apr. 19, 1973

[21] Appl. No.: 352,505

[52] U.S. Cl..... 260/45.75 R, 260/2.5 P, 260/2.5 FP
[51] Int. Cl. ............................................. C08f 45/62
[58] Field of Search........ 260/45.75 R, 2.5 P, 2.5 R, 260/2.5 FP, 41 B

[56] References Cited
UNITED STATES PATENTS

| | | | |
|---|---|---|---|
| 3,326,832 | 6/1967 | Rauschenbach | 260/45.75 |
| 3,474,464 | 10/1969 | Matthews et al. | 260/45.75 |

Primary Examiner—V. P. Hoke
Attorney, Agent, or Firm—Donald L. Johnson; Robert A. Linn

[57] ABSTRACT

Vanadium compounds impart smoke retardant properties to combustible materials such as plastics. Thus, for example, polyvinyl chloride does not emit as much smoke during combustion when it is compounded with $V_2O_5$.

5 Claims, No Drawings

SMOKE RETARDANT VINYL CHLORIDE POLYMER COMPOSITIONS

BACKGROUND OF THE INVENTION

This invention provides additives for plastics that will decrease their tendency to smoke when burned. It is believed that such use of the additives provided has not been described in the art.

Netherlands patent No. 69/18,861 is reported to teach that preparations of antimony trioxide and an inorganic salt impart flame and smoke reducing properties to resin compositions.

Iron oxide and other oxides have been added to polyvinyl halide for pigment purposes; Woernle, SPE Journal, pages 535–544 (May 1960); DeCaste and Hansen, Ibid. 18 No. 4, pages 431–439 (April 1962).

SUMMARY OF THE INVENTION

In one aspect, this invention provides a polyvinyl halide admixed with a smoke retardant amount of vanadium oxide. Vanadium pentoxide is the preferred vanadium oxide for the above compositions.

This invention also provides a method for imparting smoke retardancy to plastics which method comprises blending resins with vanadium compounds such as set forth above. Similarly, this invention provides blends of vanadium compounds for incorporation in resins. Such blends may be mixtures of the compounds themselves or the compounds or mixtures can be combined with the resin or other materials such as a solvent, or a plasticizer or other ingredient utilized to form a resin composition.

Smokes can be a hazard during a fire. Dense smoke hampers fire fighting measures and can obscure escape routes for those within a burning enclosure. Therefore, building materials which emit lesser amounts of smoke during combustion can be a safety feature. This invention serves to provide compositions with lessened tendencies to smoke; and, accordingly, one utility of this invention pertains to improvement in materials utilized in construction. However, formulations of this invention can be used wherever it is desirable to use materials which can lessen the amount of smoke produced upon combustion.

DESCRIPTION OF PREFERRED EMBODIMENTS

In the practice of this invention, a smoke retardant amount of additive is used to treat a combustible material such as a plastic resin.

Polyvinyl halide resins can be used in this invention. Applicable polyvinyl halides include homopolymers, copolymers and polymer mixtures. Illustrative and non-limiting examples of applicable polyvinyl halide resins are:

(1) Homopolymers — Polyvinyl chloride, polyvinyl bromide, polyvinyl fluoride, polyvinylidene chloride, polydichlorostyrene and the like, (2) Copolymers — Vinylchloride-vinyl acetate, vinyl-chloride-vinyl alcohol, vinylchloride-vinylidene chloride, vinylchloride-diethyl maleate, vinyl chloride esters of unsaturated alcohols and unsaturated acids and the like, and (3) Mixtures — Polyvinyl chloride and polydichlorostyrene, polyvinyl chloride and vinyl acetate-vinyl chloride copolymer, polyvinyl chloride, polyvinylidene chloride, and a copolymer of vinyl chloride-diethylmaleate and the like.

The resins can be treated with the smoke retardant additive or additives in any convenient manner. In some instances, smoke retardancy may be achieved by treating one or more surfaces of a plastic article with the additive or additives such that a treated surface is overlayed or padded with the additive composition. However, in general, it is preferred to blend an additive within a resin composition. The blending can be accomplished by any appropriate blending or mixing technique available in the art.

In the practice of this invention, a smoke retardant amount of provided additive is used to treat a combustible substance. In general, there is usually a relationship between the smoke retardancy achievable and the amount of additive employed. Therefore, at least within some concentration range, usually a greater amount of additive will provide a greater amount of smoke retardancy, all other factors remaining the same. In some instances, there is a practical upper limit on the amount of additive used. This upper limit is based on secondary factors such as cost, ease of blending, or interference with some other desirable property of the substrate, for example. In many instances, from about 0.5 to about 40 parts are used for each 100 parts of substrate resin. Preferably from about 1 to about 30 parts for 100 parts resin, more preferably 1 to about 15 parts per 100 parts resin are employed. However, greater or lesser amounts can be used if desired.

Vanadium pentoxide can be used. The applicability of this oxide suggests the use of other vanadium compounds such as $VCl_2$, $VCl_3$, $VCl_4$, $V_2O_3$, $VO_2$, $VOBr_2$, $VOBr_3$, $VOCl$, $VOCl_2$, $VOCl_3$, $VOSO_4$ and these vanadium halides, oxides and vandodyl halides and sulfates suggest organovanadium compounds such as dicyclopentadienyl vanadium dichloride and cyclopentadienyl vanadium tetracarbonyl.

EXAMPLE

Preparation of Sample

| | |
|---|---|
| "Ethyl" PVC resin SM-250 | 100 parts |
| diisooctyl phthalate | 30 parts |
| vanadium pentoxide or acetonyl acetonate | 2 weight percent as vanadium |
| Mark WS (stabilizer) | 1 part |
| stearic acid | 0.5 part |

All ingredients were mixed by hand for 3–5 minutes. The mixture was milled on a two roll rubber mill at 310°F. for 5 minutes. The resulting sheets were stored at 73°F. overnight. Sample sheets 3½ × 1 × ¼ inch were molded at 350°F. and cooled to room temperature. Three samples 1 × 1 × ¼ inch were cut from each sample sheet.

Smoke Test

The samples were burned in a smoke chamber substantially in accordance with ASTM Method D2843-70. The samples were stored at 50 percent humidity for a minimum of 40 hours prior to testing. In the test an Am result less than 100 signifies smoke retardation.

Results[1]

Am*   $t_{A-70}$** (min)

-Continued

| Results[1] | | |
|---|---|---|
| blank | 99+ | .31, .32, .36 |
| vanadium pentoxide | 97 | 0.49 |
| vanadium (III) acetonyl-acetonate | 97 | 0.70 |

[1] samples were placed on wire screen and wire basket was inverted over sample
*maximum percent light absorption
**$t_{A-70}$ (min) — time in minutes for light absorption to reach 70%

Specimens 3 × 3 inches square and 50 mil thick were cut. The condition specimen was placed on aluminum foil cut to size to permit overlapping of the specimen face on all four sides. The wrapped specimen was placed in a holder and burned in the Aminco NBS smoke chamber according to the directions supplied. The amount of smoke was measured by a photomultiplier. Specific optical density was calculated and corrected for soot remaining on the lens at the end of the test. The average of two values was reported.

When vanadium pentoxide was added at 15 phr (10 wt percent) the SODc was 413 when compared to the SODc value of 586 for the blank.

Similar results are obtained when the above tests are repeated using 0.5 to 40 parts per hundred of additive selected from $VCl_2$, $VCl_3$, $VCl_4$, $V_2O_3$, $VO_2$, $VOBr_2$, $VOBr_3$, $VOCl$, $VOCl_2$, $VOCl_3$, $VOSO_4$ and when the resin composition contains 0–30 phr plasticizer selected from those set forth in Column 11, lines 10–38 and the homopolymers, copolymers and resin mixtures (listed when describing applicable resins) above are used.

When vanadium acetonylacetonate was present in Reichold Chemical Corporation's Polylite 31-007 polyester resin at 5 weight percent the Am (percent) was 98+ and the $t_{A=70}$ (min) was 0.91 compared to the blank values of 100− and 0.63 respectively.

Vanadium compounds such as above can be used in polyvinyl halide-containing foams such as those of U.S. Pat. Nos. 3,338,845, 3,338,846, and 3,409,580.

As indicated above this invention can be used to provide plastic compositions for making articles which afford lesser amounts of smoke upon combustion. For manufacture of such articles the polymer may be supplied admixed with a smoke retardant amount of one or more additives provided by this invention.

I claim:

1. As a composition of matter, a polyvinyl halide admixed with a smoke retardant amount of a vanadium oxide.

2. The composition of claim 1 wherein said polyvinyl halide is polyvinyl chloride.

3. The composition of claim 1 wherein said oxide is vanadium pentoxide.

4. The composition of claim 1 wherein a vanadium oxide is present in an amount of from about 0.5 to about 40 parts by weight per each 100 part by weight portion of said polyvinyl halide.

5. As a composition of matter, a polyvinyl halide admixed with a smoke retardant amount of vanadium acetonyl-acetonate.

* * * * *